United States Patent
Masson et al.

(10) Patent No.: US 8,640,823 B2
(45) Date of Patent: Feb. 4, 2014

(54) DEVICE FOR REDUCING AERODYNAMIC NOISE FROM AN AIRCRAFT UNDERCARRIAGE

(75) Inventors: Richard Masson, Les Loges en Josas (FR); Thierry Rougier, Vile d'Avray (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 65 days.

(21) Appl. No.: 13/264,501

(22) PCT Filed: Apr. 15, 2010

(86) PCT No.: PCT/EP2010/054988
§ 371 (c)(1),
(2), (4) Date: Dec. 23, 2011

(87) PCT Pub. No.: WO2010/119109
PCT Pub. Date: Oct. 21, 2010

(65) Prior Publication Data
US 2012/0097480 A1    Apr. 26, 2012

(30) Foreign Application Priority Data
Apr. 16, 2009    (FR) ...................................... 09 01845

(51) Int. Cl.
*E04B 1/82* (2006.01)
*G10K 11/04* (2006.01)
*B64C 1/40* (2006.01)
*B64C 25/00* (2006.01)

(52) U.S. Cl.
USPC ......... 181/284; 181/200; 244/1 N; 244/100 R

(58) Field of Classification Search
USPC .... 181/284, 200; 244/1 N, 10, 100 R, 102 A, 244/102 R, 129.4, 198, 214; 428/218, 596, 428/598; 228/112.1; 340/960
See application file for complete search history.

(56) References Cited

U.S. PATENT DOCUMENTS

| | | | | |
|---|---|---|---|---|
| 3,955,832 A * | 5/1976 | Kalmanson | ................ | 280/476.1 |
| 4,575,058 A * | 3/1986 | Daraz | ................ | 267/70 |
| 5,727,805 A * | 3/1998 | La Roque | ................ | 280/478.1 |
| 6,863,294 B1 * | 3/2005 | Bonham | ................ | 280/479.2 |
| 2005/0186055 A1 * | 8/2005 | Hyatt | ................ | 414/427 |
| 2008/0078866 A1 * | 4/2008 | Parker et al. | ................ | 244/100 R |
| 2009/0176078 A1 * | 7/2009 | Seror et al. | ................ | 428/218 |
| 2009/0283634 A1 * | 11/2009 | Tran | ................ | 244/102 A |
| 2011/0315744 A1 * | 12/2011 | Masson et al. | ................ | 228/112.1 |
| 2012/0049411 A1 * | 3/2012 | Masson et al. | ................ | 264/299 |
| 2012/0326894 A1 * | 12/2012 | Schmidt et al. | ................ | 340/960 |

FOREIGN PATENT DOCUMENTS

| | | | | |
|---|---|---|---|---|
| DE | 32 07 665 A1 | 5/1983 | | |
| DE | 3207665 A1 * | 5/1983 | ................ | E04B 1/84 |
| EP | 1 067 045 A1 | 1/2001 | | |
| EP | 1067045 A1 * | 1/2001 | ................ | B64C 7/00 |
| EP | 1 900 545 A1 | 3/2008 | | |
| EP | 1 977 969 A1 | 10/2008 | | |

* cited by examiner

*Primary Examiner* — David Warren
*Assistant Examiner* — Christina Russell
(74) *Attorney, Agent, or Firm* — Sughrue Mion, PLLC

(57) ABSTRACT

In the field of aviation, a device for limiting aerodynamic noise from a deployed aircraft undercarriage during landing and/or takeoff. The device comprises two end plates (4a, 4b) for closing respective ends (2a, 2b) of a hollow pin (1) of the undercarriage, such as a hinge pin between two rods of the undercarriage, together with at least one tie (6) for engaging inside the hollow pin (1) to connect the two end plates (4a, 4b) together so as to hold them pressed against the ends (2a, 2b) of the pin (1).

8 Claims, 1 Drawing Sheet

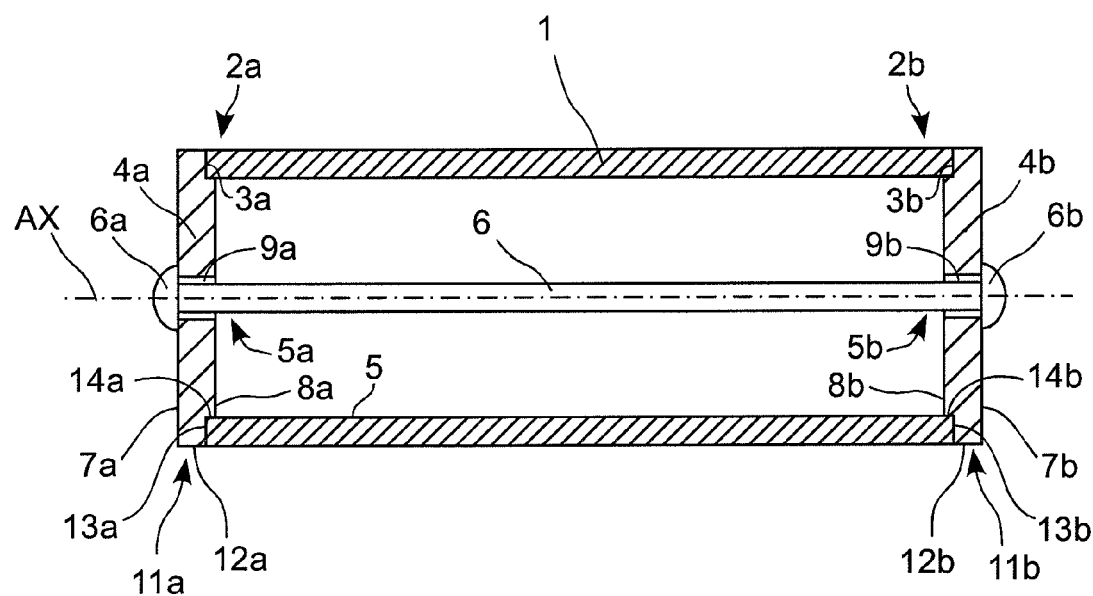

DEVICE FOR REDUCING AERODYNAMIC NOISE FROM AN AIRCRAFT UNDERCARRIAGE

The invention relates to reducing the aerodynamic noise that is generated by a deployed retractable aircraft undercarriage during takeoff and/or landing.

CROSS REFERENCE TO RELATED APPLICATIONS

This application is a National Stage of International Application No. PCT/EP2010/054988 filed Apr. 15, 2010, claiming priority based on French Patent Application No. 0901845 filed Apr. 16, 2009, the contents of all of which are incorporated herein by reference in their entirety.

BACKGROUND OF THE INVENTION

It is found that a major source of the noise generated during takeoff and landing of an aircraft comes from its retractable undercarriages. Specifically, a retractable undercarriage comprises a set of wheels carried by a structure that is designed to be movable so as to enable the entire undercarriage to be retracted once the aircraft is in flight.

Given the various constraints that such an undercarriage needs to satisfy, such as withstanding forces while landing and taxiing, or the necessity of ensuring that the undercarriage can be deployed under all circumstances, the structure carrying the wheels is relatively complex.

Such a structure comprises a central leg that is pivotally mounted about a top transverse axis, and that carries the set of wheels at its bottom end. The structure also includes a plurality of bars or rods that are hinged to the leg, to the structure of the aircraft, and to one another, by as many hinges, each of which includes a pin about which the elements that are hinged together pivot. In order to reduce weight, the pins are generally hollow.

The undercarriage thus includes two rods forming a side brace for locking the leg in its deployed position, and, when the undercarriage is a nose undercarriage, two other rods that constitute a scissors linkage capable of transmitting steering movement about a vertical axis from an upper portion to the set of wheels in order to steer the aircraft.

Furthermore, the undercarriage also includes a series of flexible hydraulic and other pipes that are provided in redundant manner, going from a top portion of the undercarriage down to brakes that are fitted to the set of wheels, the pipes serving to convey the hydraulic power needed for braking.

The flexible pipes are secured to the components of the structure at particular points, e.g. by means of collars, in such a manner as to ensure they retain sufficient flexibility to enable the undercarriage to be deployed and to be retracted without damaging the pipes.

Specifically, such a retractable structure with its pieces of equipment presents a geometrical shape that is complex with a multitude of openings, baffles, and passages that generate a very large amount of aerodynamic noise when a stream of air traveling at high speed passes therethrough.

Furthermore, reducing the noise generated by an aircraft while landing and taking off nowadays constitutes a major concern.

OBJECT OF THE INVENTION

The object of the invention is to propose a solution for remedying that drawback.

SUMMARY OF THE INVENTION

To this end, the invention provides a device for limiting aerodynamic noise from a deployed aircraft undercarriage while landing and/or takeoff, the device comprising two end plates for closing respective ends of a hollow pin of the undercarriage, such as a hinge pin between two rods of the undercarriage, together with at least one tie for engaging inside the hollow pin to connect the two end plates together so as to hold them pressed against the ends of the pin.

With this solution, the aerodynamic noise of any undercarriage can be reduced without there being any need to modify the undercarriage in question, merely by means of an operation that consists in fastening two end plates to each hollow hinge pin, with the end plates being connected together by a central tie that holds them in position.

The invention also provides a device as defined above, wherein the end plates and/or the tie are made of natural fibers such as hemp or flax fibers agglomerated in a resin of reusable type.

Since the end plates and the tie are made of material that is relatively weak, they do not run any risk of damaging the blades of a jet of the aircraft itself or of a later aircraft should they become detached and drop onto the runway. Under such circumstances, the end plates also do not run any risk of damaging tires, nor do they run any risk of jamming the undercarriage while it is being raised or deployed on the aircraft itself or on a later aircraft.

The device may thus be in the form of a consumable that is made of a composite material that is degradable and/or reusable, such that the device can be considered to be an "eco-product". Furthermore, the flexibility of the materials used enables the device to adapt to mechanical deformation of the pin.

The invention also provides a device as defined above, wherein at least one end plate includes a central orifice for having the tie pass therethrough in order to secure the tie to the end plate by means of the end of the tie passing through the end plate.

A single central tie can thus be used for holding the two end plates pressed against the ends of the hollow pin. Each end of the tie projecting through an end plate may then be connected to the end plate by any means, e.g. by attaching the end to the central orifice or to the outer face of the end plate by means of a knot, crimping, etc.

The invention also provides a device as defined above, wherein at least one locking means such as a staple for securing rigidly to an end of a tie passing through an end plate via its orifice, the locking means presenting a section greater than that of the orifice so as to bear against an outer face of the end plate.

With this solution, securing a tie to the end plate consists merely in crimping an additional staple to each end of the tie passing through an end plate when the assembly is in place.

The invention also provides a device as defined above, wherein the end plate is provided with means for locking an end of the tie passing through the central orifice therein.

By way of example, the central orifice may be itself designed to constitute a locking member, e.g. by presenting a star-shaped cutout in which the inwardly-directed tips then constitute teeth for locking the tie.

The invention also provides a device as defined above, wherein the material of the tie is a thermoplastic for connecting said tie to an end plate by using a source of heat to flatten the termination of the end of the tie passing through the central orifice of the end plate.

The invention also provides a device as defined above, wherein one face of one of the end plates includes centering means whereby it is engaged in the end of the pin that it is to close.

The invention also provides a device as defined above, wherein the centering means are formed by a reduction in the diameter of the outside edge of the end plate.

The invention also provides a device as defined above, wherein at least one end plate includes one or more openings to avoid moist air accumulating inside the pin.

BRIEF DESCRIPTION OF THE SOLE FIGURE

The sole FIGURE is a longitudinal section view showing a hollow pin of a hinge between two undercarriage elements and fitted with a device of the invention.

DETAILED DESCRIPTION OF THE INVENTION

The idea on which the invention is based lies in the observation that in a retractable undercarriage, the hollow pins that are used for hinging the various moving elements to one another, themselves constitute a significant source of aerodynamic noise.

In the invention, the ends of a hollow pin are closed by a pair of end plates that are connected together by an internal tie that presses or locks each of them against the end that it closes. The end plates and the tie are made of relatively weak material so that in the event of them becoming detached and dropping onto a runway, they will not damage the aircraft itself or a later aircraft.

The assembly constituted by the end plates and the tie may then be made out of a material that is of low cost, preferably a recyclable material, so that the device constitutes a consumable for single use. By way of example, when it is necessary to inspect the hollow pin, the existing end plates and tie are destroyed on being removed, and new end plates with a new tie are put into place after the inspection.

As shown in FIG. 1, a hollow pin 1 of an undercarriage hinge (not shown) is cylindrical in shape, extending along and around a hinge axis AX. It comprises first and second ends 2a and 2b, each formed by a right section defining a respective end face, these end faces being referenced respectively 3a and 3b. Each end face is in the form of a plane circular annulus extending in a plane that is normal to the axis AX.

The first and second ends 2a and 2b are closed by respective first and second end plates 4a and 4b that are connected to each other by a tie 6 that is engaged in the hollow pin 1, these end plates also being centered against the inner face 5 of the hollow pin 1.

The first end plate 4a is generally disk-shaped, being defined by a plane outer face 7a and a plane inner face 8a, and it includes a central orifice 9a that passes right through it. This end plate presents an outer edge 11a that comprises in succession: a first cylindrical portion 12a joining the plane outer face 7a; extended by a bearing face 13a in the shape of a plane circular annulus; and itself extended by a second cylindrical portion 14a joining the plane inner face 8a.

The second end plate 4b has the same shape as the first end plate 4a, and likewise comprises an outer face and an inner face 7b and 8b that are plane, together with a central orifice 9b. Its edge 11b is likewise constituted by three portions 12b to 14b, identical to the portions 12a to 14a.

As can be seen in the FIGURES, the first cylindrical portions 12a and 12b are of a diameter that corresponds to the outside diameter of the pin 1. The second cylindrical portions 14a and 14b have a smaller diameter that corresponds to the diameter of the inside face 5 of the pin 1, for the purpose of centering each of the end plates in the corresponding end of the pin 1.

These end plates are thus generally axially symmetrical in shape and they present thickness that is small, being of the order of a few millimeters.

In addition, at least one of the end plates includes one or more additional openings that constitute vents for the purpose of preventing moist air or other fluids remaining trapped in the space defined by the hollow pin and the end plates, in order to reduce the risks of the pin oxidizing.

When the plates are in place, as shown in the FIGURE, each of them is pressed via its bearing face 13a, 13b against the corresponding end face 3a, 3b of the pin 1. The two end plates are held pressed against the ends of the pin by the central tie 6 which connects the two end plates together while being substantially under tension.

In the example of FIG. 1, the ends 5a and 5b of the central tie 6 pass through respective central orifices 9a and 9b, and the terminations 6a and 6b of these ends are flattened after the assembly has been installed on the hollow pin 1 so that these terminations present diameters that are greater than the diameters of the orifices 9a and 9b.

When the entire device is in place, as shown in the FIGURE, the tie 6 prevents the end plates from separating from the tube, and it is optionally under a small amount of tension in order to urge the end plates towards each other, the terminations 6a and 6b bearing respectively against the outer faces 7a and 7b of the end plates.

In practice, the material constituting the tie 6 may be a thermoplastic material so as to make the operation of flattening its ends easier during installation. Under such circumstances, the operator makes use of a source of heat initially for flattening the end 6a of the tie 6 and engaging the tie through the orifice 9a in the first end plate 4a prior to engaging the tie through the hollow pin 1 so that it projects from the end 2b of the pin 1.

The operator can then engage the free end of the tie 6 in the orifice 9b of the second end plate 4b and engage the second end plate 4b in the end 2b of the hollow pin 1. At this stage, the operator takes hold of the free end of the tie 6, pulling it outwards so as to put the tie under a relatively large amount of tension, with the tie being held by pliers placed against the outer face 7b of the second end plate. In this situation, the operator uses the source of heat to flatten the end 6b of the tie against the sides of the pliers being used.

Once the end 6b has been flattened, the operator allows it to cool down before releasing the pliers so that the end comes to bear against the outer face 7b of the second end plate, in elastic manner. It will readily be understood that once installed, the tie is under tension and is connected to both end plates so as to hold them in position.

Other embodiments of the device can be envisaged concerning the general way in which the end plates are secured by one or more ties passing along the hollow pin.

For example, the system may be provided in such a manner that the tie is initially secured to one of the pins, e.g. being fastened to its inside face.

Furthermore, a tie may be secured to an end plate by means of an external staple that is crimped onto the end of the tie where it passes through an end plate. Under such circumstances, the installation is analogous to that in which the tie is made of thermoplastic material, except that instead of flattening its ends, the operator crimps a staple onto each end of the tie, e.g. using a crimping tool.

It is also possible to provide means for locking a tie end carried by one or the other or both of the end plates. For this purpose, the central orifice of one of the end plates may be provided with a star or other shape such that the inwardly-directed tips of the star-shaped cutout constitute teeth that lock the tie when it is passed through the central orifice.

The locking means may also be of any other shape, e.g. being situated on the outer face of the end plate in question.

Each end plate may also include a tie that is previously fastened to its inner face, with one of the ties then having an end provided with a clamp of the strap-tensioner type including a jaw that is closed by resilient return means.

Under such circumstances, the operator engages the tie carrying the clamp inside the hollow pin 1, and then engages that tie in the clamp situated at the end of the other tie, and passes it back into the pin. The operator can then pull on the free tie to move the two end plates towards each other while ensuring that both ties are both under tension, which ties are joined together inside the hollow pin by the clamp forming a strap-tensioner or brake.

Furthermore, the device may be made out of materials based on fibers of biological origin and on resin of reusable type in order to reduce the impact of fabrication on the environment, while also obtaining a device at low cost.

The end plates may be fabricated from short fibers of natural origin such as hemp or flax fibers, and from a thermoplastic resin or biopolymers in which the fibers are agglomerated.

The tie may be made from one or more strands of hemp or flax fibers of natural origin and coated or embedded in a thermoplastic resin or biopolymers.

In general, the device constitutes a non-stressed member since forces other than those that serve to hold it in place do not pass through this member. The flexibility of the end plates and of the tie serve to absorb impacts, e.g. while landing. If an impact is too great, then the device may be separated from the pin and may be destroyed without damaging the aircraft itself or any later aircraft.

The invention claimed is:

1. A device for limiting aerodynamic noise from a deployed aircraft undercarriage, having a hollow pin (1), while landing and/or takeoff, the device comprising:

two end plates (4a, 4b) for closing respective ends (2a, 2b) of the hollow pin (1) of the undercarriage, and at least one tie (6) disposed inside the hollow pin (1) to connect the two end plates (4a, 4b) together so as to hold them pressed against the ends (2a, 2b) of the hollow pin (1), wherein the end plates (4a, 4b) and/or the tie (6) are made of natural hemp or flax fibers agglomerated in a resin of reusable type.

2. A device according to claim 1, wherein at least one end plate (4a, 4b) includes a central orifice (9a, 9b) for having the tie (6) pass therethrough in order to secure the tie (6) to the end plate (4a, 4b) by means of the end of the tie (1) passing through the end plate.

3. A device according to claim 2, further including at least one locking means for securing rigidly to an end of a tie (6) passing through an end plate (4a, 4b) via its orifice (9a, 9b), the locking means presenting a section greater than that of the orifice (9a, 9b) so as to bear against an outer face (7a, 7b) of the end plate (4a, 4b).

4. A device according to claim 2, wherein the end plate (4a, 4b) is provided with means for locking an end of the tie (6) passing through the central orifice thereof.

5. A device according to claim 2, wherein the material of the tie (6) is a thermoplastic for connecting said tie (6) to an end plate (4a, 4b) with a heat flattened termination portion (6a, 6b) of the tie passing through the central orifice (9a, 9b) of the end plate (4a, 4b).

6. A device according to claim 1, wherein one of the end plates (4a, 4b) includes centering means (14a, 14b) whereby it is engaged in the end of the pin (1) that it is to close.

7. A device according to claim 6, wherein the centering means are formed by a reduction in the diameter (14a, 14b) of the outside edge of the end plate (4a, 4b).

8. A device according to claim 1, wherein at least one end plate includes one or more openings to avoid moist air accumulating inside the pin.

\* \* \* \* \*